(12) United States Patent
Misawa

(10) Patent No.: US 7,019,961 B2
(45) Date of Patent: Mar. 28, 2006

(54) ARRANGEMENT OF CARD SLOT IN LAPTOP COMPUTER

(75) Inventor: Takeshi Misawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/432,087

(22) Filed: Nov. 2, 1999

(65) Prior Publication Data
US 2002/0196599 A1 Dec. 26, 2002

(30) Foreign Application Priority Data
Nov. 2, 1998 (JP) .................................. 10-312085

(51) Int. Cl.
*H05K 5/02* (2006.01)
(52) U.S. Cl. ...................... 361/681; 361/683; 361/684; 312/223.2
(58) Field of Classification Search ................ 361/683, 361/685, 724, 725, 727, 681, 684, 686; 312/223.2; 348/794; 248/917–924; 345/169, 905; D14/316
See application file for complete search history.

(56) References Cited

U.S. PATENT DOCUMENTS

| 5,020,090 | A | * | 5/1991 | Morris ......................... 379/58 |
| 5,043,721 | A | * | 8/1991 | May ........................... 340/7.54 |
| 5,440,449 | A | * | 8/1995 | Scheer ........................ 361/686 |
| D363,471 | S | * | 10/1995 | Shima et al. .............. D14/106 |
| 5,608,863 | A | * | 3/1997 | Ishizawa et al. ............. 395/501 |
| 5,619,395 | A | * | 4/1997 | McBride ..................... 361/683 |
| 5,684,672 | A | | 11/1997 | Karidis et al. |
| 5,768,163 | A | * | 6/1998 | Smith, II ............... 364/705.01 |
| 5,781,405 | A | * | 7/1998 | Vossler ....................... 361/523 |
| 5,786,983 | A | * | 7/1998 | Brenner et al. ............. 361/680 |
| 5,880,928 | A | * | 3/1999 | Ma ............................ 361/683 |
| 6,118,653 | A | * | 9/2000 | Kim ........................... 361/683 |
| 6,417,884 | B1 | * | 7/2002 | Chang et al. ............... 348/373 |
| 6,717,801 | B1 | * | 4/2004 | Castell et al. .............. 361/683 |
| 2003/0137805 | A1 | * | 7/2003 | Wu ............................ 361/686 |

FOREIGN PATENT DOCUMENTS

JP          08153175 A      11/1996

OTHER PUBLICATIONS

The IEEE Standard Dictionary of Electrical and Electronics Terms, Sixth Edition, copy of p. 383.*

* cited by examiner

*Primary Examiner*—Anatoly Vortman
(74) *Attorney, Agent, or Firm*—Birch, Stewart, Kolasch & Birch, LLP

(57) ABSTRACT

A display unit containing a display is openably attached to a base unit of a laptop computer. While the laptop computer is not in use, the display unit is closed over the top face of the base unit with a display face of the display being inward. To use the laptop computer, the display unit is opened to form a desirable angle with the operation face of an input part on the base unit. A PC card slot is formed in the display unit, and a card can be mounted at a position away from a keyboard. Therefore, the card inserted into the PC card slot does not obstruct the operation of the input part. Particularly, if the PC card slot is arranged above at the top of the display, the signal transmission in the wireless communication using a wireless communication card can be performed efficiently and an operator of the personal computer can easily take a picture by a PC card camera.

23 Claims, 5 Drawing Sheets

ARRANGEMENT OF CARD SLOT IN LAPTOP COMPUTER

BACKGROUND OF THE INVENTION

1. Field of the Invention

The present invention relates generally to notebook or laptop computers, and more particularly to the arrangement of a card slot, which accepts compatible cards for enhancing the computer's functions.

2. Description of Related Art

Shown in FIG. 8 is a conventional laptop computer 80. A display unit 84 is openably attached to a base unit 82 through a connection part 85. A keyboard 86 as an input device is provided at the top part of the base unit 82, and a display 88 is contained in the display unit 84. Such a laptop computer normally has a PC card slot 90 confirming the Personal Computer Memory Card International Association (PCM-CIA) standard arranged at the side of the base unit 82. The PC card slot 90 is an externally accessible expansion slot to accept a compatible card or a PC card (a small, removable, externally accessible circuit board housing a device such as a modem or disk drive) for enhancing the computer's functions.

Some types of cards protrude from the PC card slot 90, and the card protruding from the PC card slot 90 obstructs the operation of the keyboard 86 and makes it difficult to handle the card since the PC card slot 90 is arranged near the keyboard 86. Shown in FIG. 9 is the laptop computer 80 with a radio wave communication card 92 in the PC card slot 90. U.S. Pat. No. 5,684,672 pointed out that an antenna 93 extending from the side of the base unit 82 can be shadowed by the ground plane of the display 88 decreasing transmission efficiency, and it proposed to a laptop computer with an antenna attached to its cover in order to prevent the transmission efficiency from being lowered. This is, however, complicated and requires much cost.

On the other hand, Japanese Provisional Publication No. 8-153175 proposed a camera card to be inserted into the PC card slot, but if such a PC card type camera is used for the conventional laptop computer, it is difficult to fix the camera and the attached cable is obstructive. If a PC card type electronic camera 95 without a cable is inserted into the PC card slot 90 as shown in FIG. 10, an image pickup part 96 is positioned near the keyboard 86. In this case, the image pickup part 96 is shadowed by the hand of the operator, and this is very inconvenient. For this reason, the conventional laptop computer 80 cannot realize a TV conference system, or the like.

SUMMARY OF THE INVENTION

It is an object of the present invention to provide a personal computer that does not obstruct the operation thereof even if a card inserted in a PC card slot or if a cable, or the like is attached to the card.

To achieve the above-mentioned object, the present invention is directed to a personal computer, comprising: a base unit; an input part arranged on the base unit, the input part having an operation face; a display unit having a display face, the display unit being operatively interconnected to the base unit in a state that the display face forms an angle less than 180° with the operation face when the personal computer is in use; and a chamber capable of accepting an external device enhancing a function of the personal computer, the chamber being arranged in the display unit.

According to the present invention, the display unit containing the display is operatively interconnected to the base unit in the state that the display face forms an angle less than 180° with the operation face of the input part when the personal computer is in use. The chamber or a card slot is formed in the display unit, and the external device or a card is positioned away from the input part or a keyboard. Consequently, the card inserted into the card slot does not obstruct the input operation, and the like.

Particularly, a wireless communication device, which transmits and receives signals in a predetermined method using radio waves or light, can be arranged at a higher position than the base unit of the personal computer, and this improves the signal transmission efficiency. Moreover, the image pickup part can be arranged at a higher position than in the conventional laptop computer, it is easier to image a person who is operating the personal computer.

Preferably, a cutout part or a transparent part is formed in the display unit so that whether a card is inserted or not can be determined by seeing through the cutout part or the transparent part.

In this specification, the "laptop computer" is the general term of a small-sized portable personal computer such as a notebook personal computer, a mobile personal computer and a portable digital assistant (PDA).

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
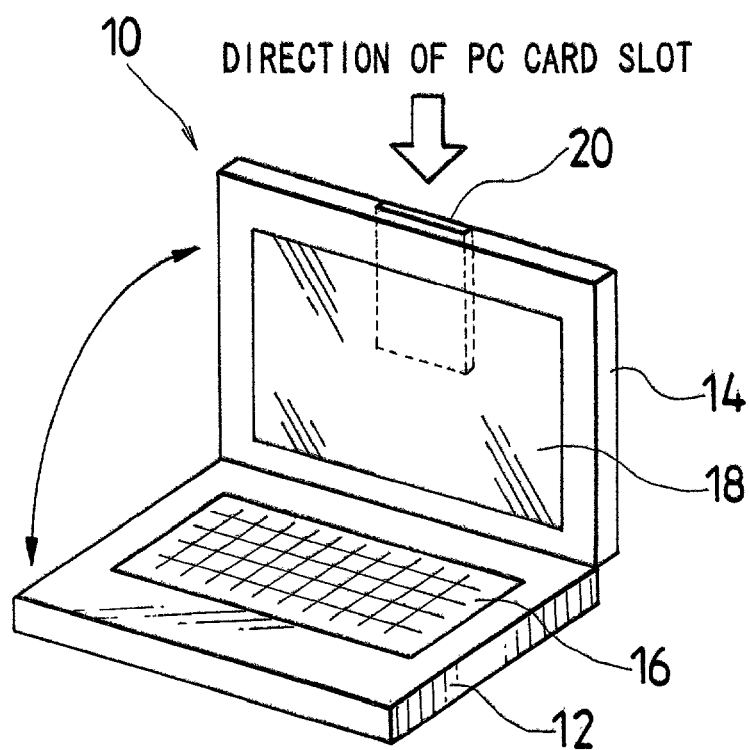
FIG. 1 is a perspective view showing the operable state of a laptop computer according to the first embodiment of the present invention.
Figure 2:
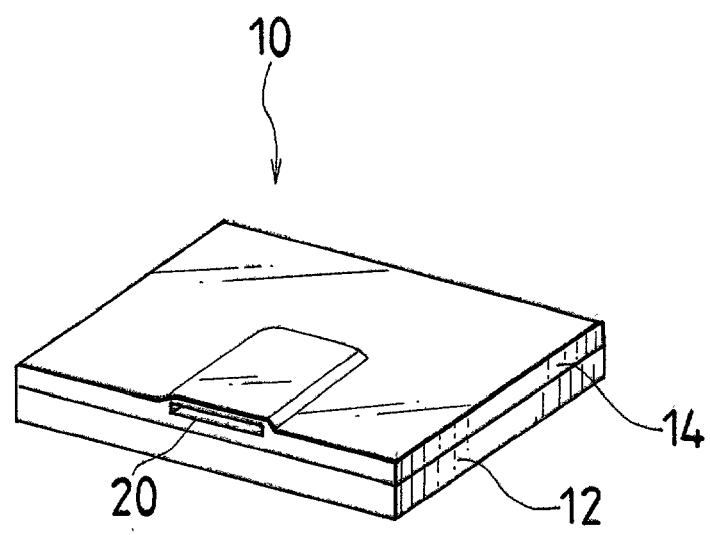
FIG. 2 is a perspective view showing the closed state of the laptop computer in FIG. 1.

FIGS. 1 and 2 are perspective views showing a laptop computer 10 according to the first embodiment of the present invention. FIG. 1 shows the laptop computer 10 that is being in use, and FIG. 2 shows the laptop computer 10 in not use or a closed state. As shown in FIGS. 1 and 2, the laptop computer 10 comprises a base unit 12 and a display unit 14, which is connected to the base unit 12 through a connection part such as a hinge mechanism (not shown).

The base unit 12 contains a memory, a hard disk, a central processing unit (CPU), and the like (not shown). An input part or a keyboard 16 is provided at the top part of the base unit 12. An input device such as a trackpad, a trackball and a joystick may be provided in addition to or instead of the keyboard 16.

A flat display 18 such as a liquid crystal display (LCD) is incorporated in the display unit 14. When the laptop computer 10 is in use, the display unit 14 is opened so that the face of the flat display 18 forms a desirable angle, which is preferably an obtuse angle or the right angle, with the operation face of the keyboard 16. When the laptop computer 10 is not in use, the display unit 14 is closed over the operation face of the keyboard 16 with the face of the display 18 being inward (see FIG. 2). In FIG. 2, the top face of the base unit 12 is entirely closed with the display unit 14. However, a part of the top face of the base unit 12 may remain exposed when the display unit 14 is closed.

The display unit 14 has a chamber or PC card slot 20, which opens at a top (in the opened state) side of the display unit 14. A PC card or a variety of external devices (hereinafter referred to as cards) enhancing functions of the laptop computer 10 can be accepted in the PC card slot 20 from above in FIG. 1.

A description will now be given of the operation of the laptop computer 10.

Figure 3:
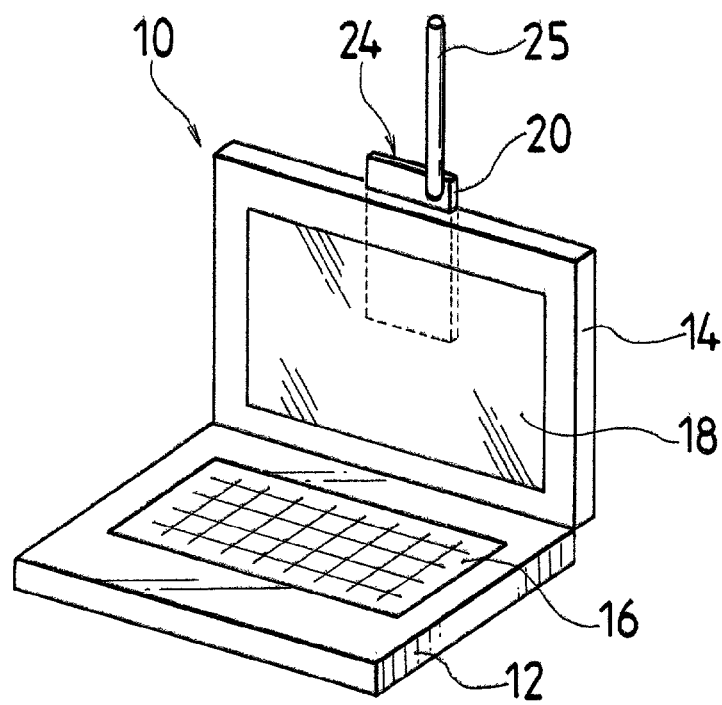
FIG. 3 is a perspective view of the laptop computer with a wireless communication card in a PC card slot.

FIG. 3 shows an example wherein a radio wave communication card 24 is mounted in the laptop computer 10 in FIG. 1. The wireless communication card 24 is shaped in such a manner as to be mounted in the PC card slot 20. The radio wave communication card 24 is inserted in the PC card slot 20 so that an antenna part 25 can be arranged almost vertically at a higher position than the display 18. The laptop computer 10 of this embodiment has the PC card slot 20 at the display unit 14, and therefore, the radio wave communication card 24 can be located at a suitable position for the transmission and reception of radio waves.

Likewise, if an infrared network communication card, which is not provided with the antenna part 25, is mounted in the PC card slot 20, an infrared signal transmission/reception part can be arranged at a higher position than the display 18. This improves the transmission and reception efficiency of the infrared signals.

Figure 4:
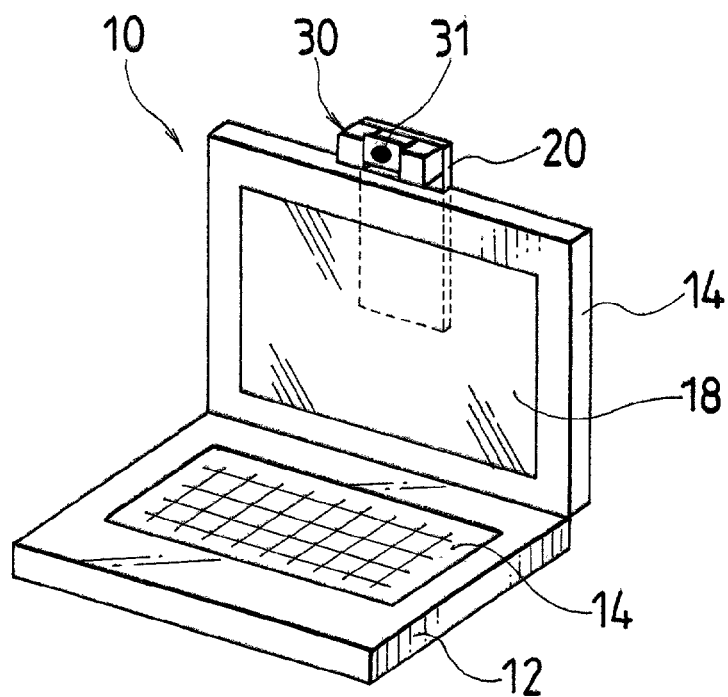
FIG. 4 is a perspective view of the laptop computer with a PC card camera in the PC card slot.

FIG. 4 shows an example wherein a PC card camera 30 is mounted in the laptop computer 10 in FIG. 1. The PC card camera 30 is shaped in such a manner as to be mounted in the PC card slot 20. By inserting the PC card camera 30 into the PC card slot 20, an image pickup part 31 is arranged at a higher position than the display 18. As is the case with a well-known electronic camera, the image pickup part 31 comprises a taking lens, an imaging device such as a CCD, and a signal processing circuit. Therefore, it is easy to capture an image of a person who is operating the laptop computer 10, and the laptop computer 10 is applicable to a TV conference system, or the like.

A description will be given of a modified example of this embodiment.

In the first embodiment described with reference to FIGS. 1–4, the PC card slot 20 is arranged at substantially the center of the top side of the display unit 14, but the present invention should not be restricted to this.

Figure 5:
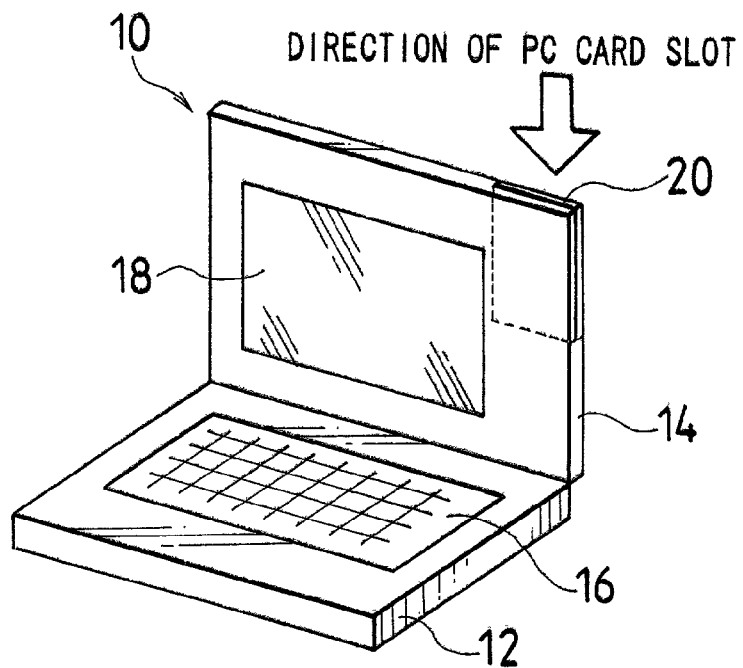
FIG. 5 is a perspective view showing a laptop computer according to the second embodiment of the present invention.

For example, if the display 18 is smaller than the display unit 14 as in the second embodiment in FIG. 5, the PC card slot 20 may be arranged at the right side (or the left side) of the display 18 in order to prevent the PC card slot 20 and the display 18 from overlapping. This reduces the thickness of the display unit 14, and eliminates the unevenness of the outer surface of the display unit 14 shown in FIG. 2.

Although the PC card slot 20 may be arranged at either right or left of the display 18, it is preferable to provide the PC card slot 20 at the right side of the display 18 as shown in FIG. 5 since the majority of operators are right-handed.

Figure 6:
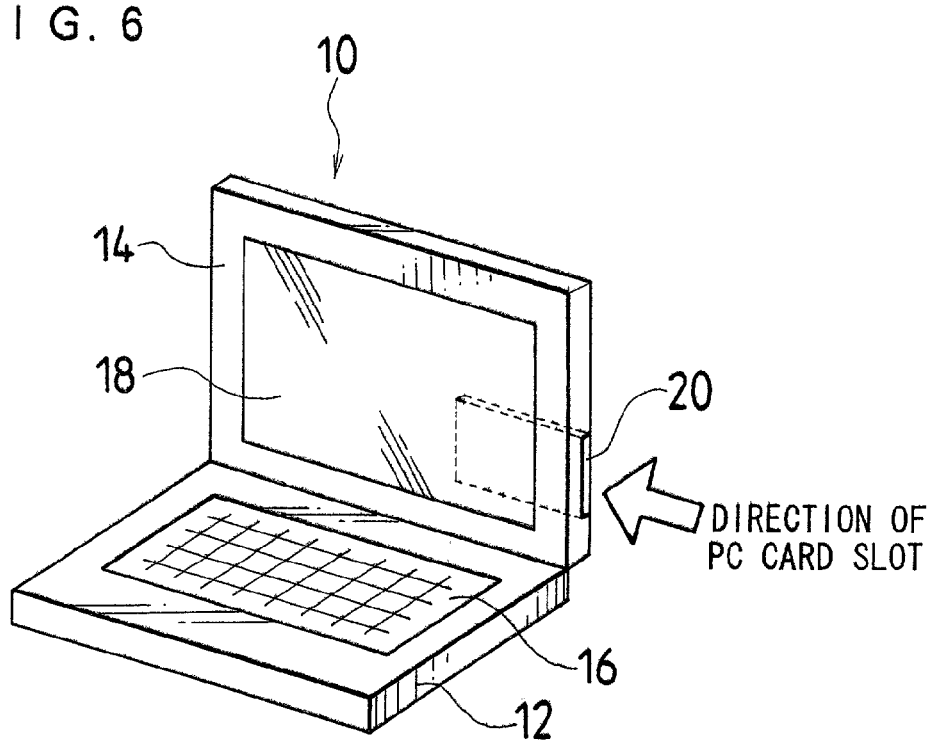
FIG. 6 is a perspective view showing a laptop computer according to the third embodiment of the present invention.

FIG. 6 shows the third embodiment of the present invention. As shown in FIG. 6, the PC card slot 20 may be provided at the right side (or the left side) of the display unit 14 so that the cards (not shown in FIG. 6) can be inserted from the right side (or the left side) of the display 18. Of course, it is possible to provide the PC card slot 20 at an arbitrary height at either the right or left side of the display unit 14.

Although not illustrated in the drawing, if the display 18 is relatively small as described with reference to FIG. 5, the PC card slot 20 is arranged at the lateral side of the display unit 14 in such a manner that the PC card slot 20 and the display 18 do not overlap each other. This reduces the thickness of the display unit 14.

Figure 7:
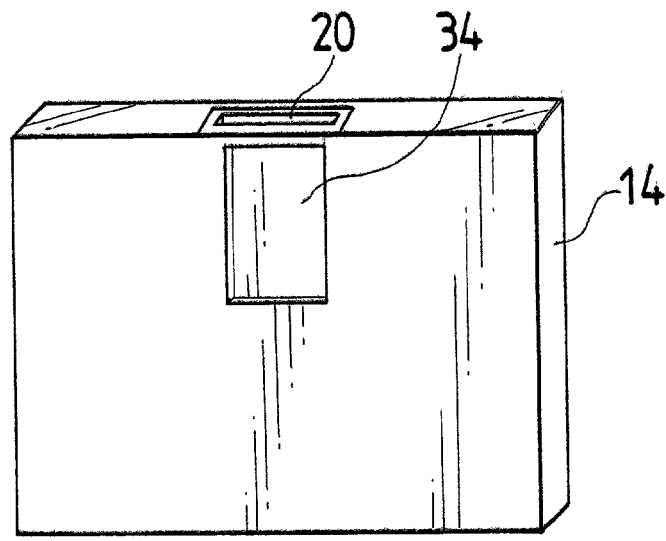
FIG. 7 is a perspective view showing the essential parts of the display unit according to another embodiment of the present invention.
Figure 8:
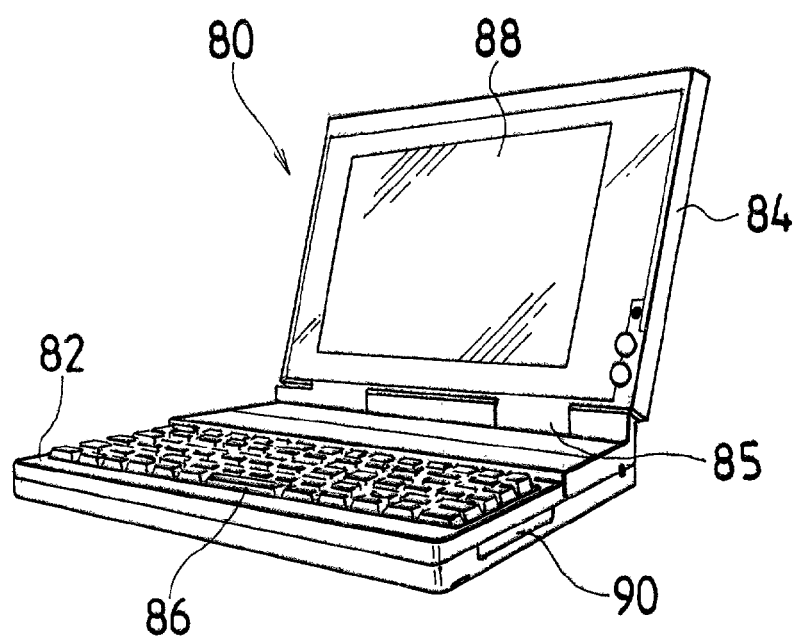
FIG. 8 is a perspective view showing an example of the conventional laptop computer.
Figure 9:
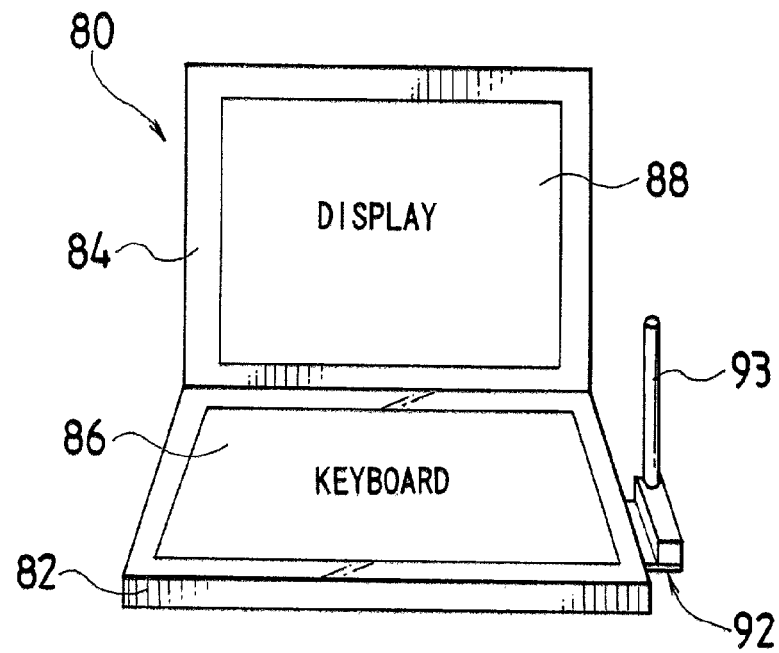
FIG. 9 is a view showing an example in which a radio wave communication card is inserted in a PC card slot of the conventional laptop computer.
Figure 10:
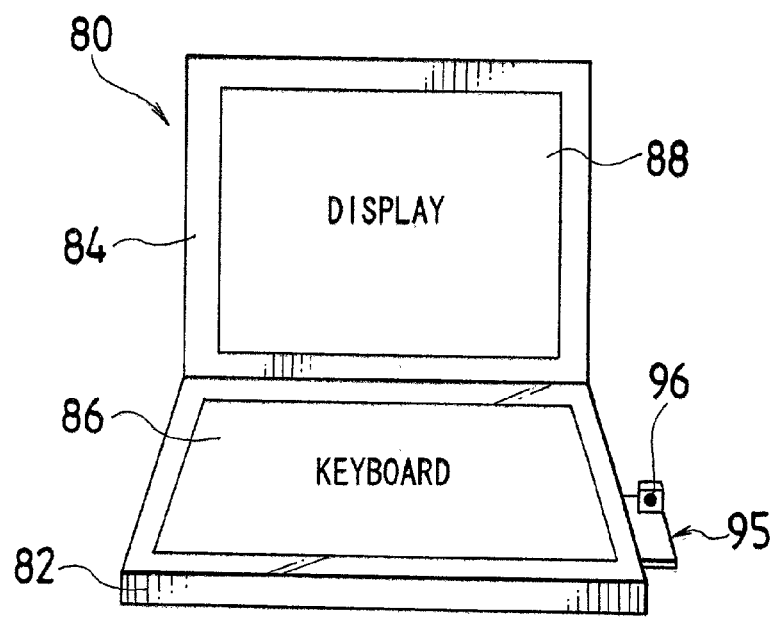
FIG. 10 is a view showing an example in which a PC card-type camera is inserted into a PC card slot of the conventional laptop computer.

It is preferable to provide a cutout part or an opening 34 in the reverse side of the display 18 as shown in FIG. 7. Whether the card is inserted or not and which type of the card is currently used can be checked through the opening 34. A transparent window may be provided instead of the opening 34. If, however, the opening 34 is formed as shown in FIG. 7, a PC card type personal digital assistant (PDA) inserted in the PC card slot 20 can be operated directly while watching the display of the PDA.

The display unit 14 is hinged to the base unit 12 in the above-described embodiments, but the display unit 14 may also be detachable from the base unit 12. In this case, a suitable connecting structure should be provided to connect the display unit 14 to the base unit 12 in the state that the face of the display 18 forms a desirable angle less than 180° with the operation face of the keyboard 16 when the laptop computer 10 is in use.

Alternatively, the display unit 14 may be rigidly joined to the base unit 12 in the state that the face of the display 18 forms a desirable angle less than 180° with the operation face of the keyboard 16. In this case, the display unit 14 cannot serve as a cover; however, the arrangement of the PC card slot 20 according to the present invention is still effective since the PC card slot 20 can be located at a higher position than the base unit 12.

As set forth hereinabove, in the laptop computer of the present invention, the PC card slot is arranged in the display unit containing the display therein. Therefore, even if the card inserted in the PC card slot protrudes from the PC card slot, or if a cable, an antenna, etc. is attached to the card, the operation of the keyboard is not obstructed by the protruding card, cable, antenna, etc., so that the laptop computer can be used efficiently. Moreover, even if the card inserted in the PC card slot includes a camera, wireless communication device, etc., the operation of the card is not obstructed by the hands of the operator.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A personal computer, comprising:
   a base unit;
   an input part arranged on the base unit, the input part having an operation face;
   a display unit having a display face, the display unit being operatively interconnected to the base unit in a state that the display face forms an angle less than 180° with the operation face when the personal computer is in use; and
   a chamber capable of accepting a removable external device enhancing a function of the personal computer, the chamber being arranged in the display unit,
   wherein the display unit comprises at least one of a cutout part and a transparent part so that whether the external device is inserted in the chamber can be determined by seeing through the at least one of the cutout part and the transparent part.

2. The personal computer as defined in claim 1, wherein the display unit is capable of closing the display face when the personal computer is not in use.

3. The personal computer as defined in claim 1, wherein the display unit is capable of closing the operation face when the personal computer is not in use.

4. The personal computer as defined in claim 1, wherein the display unit is hinged to the base unit.

5. The personal computer as defined in claim 1, wherein the display unit is rigidly joined to the base unit in the state that the display face forms the angle less than 180° with the operation face.

6. The personal computer as defined in claim 1, wherein the chamber opens at a top side of the display unit.

7. The personal computer as defined in claim 1, wherein the chamber opens at a lateral side of the display unit.

8. The personal computer as defined in claim 1, wherein the input part comprises at least one of a keyboard, a trackpad and a trackball.

9. The personal computer as defined in claim 1, wherein the external device is a memory card.

10. The personal computer of claim 9, wherein the memory card interacts with the personal computer when inserted in the chamber.

11. The personal computer as defined in claim 1, wherein the external device comprises a camera.

12. The personal computer of claim 11, wherein the camera interacts with the personal computer when inserted in a chamber.

13. The personal computer as defined in claim 1, wherein the external device comprises a wireless communication device.

14. The personal computer of claim 13, wherein the wireless communication device interacts with the personal computer when inserted in the chamber.

15. The personal computer of claim 1, wherein the removable device may be removed without the disassembly of the personal computer.

16. The personal computer of claim 1, wherein the chamber is capable of interchangeably accepting the removable device.

17. A method for providing an interface to a removable external device in a computer comprising:
   forming a chamber inside a display unit coupled to the computer, the display unit having a display face and being movably coupled to a base unit such that the display face forms an angle generally less than 180° with the base unit, and the chamber having walls for covering a bottom side, a right and left side, and a front and back side of the removable external device, wherein the chamber is configured to receive the removable external device; and
   forming an opening associated with the chamber such that only the opening of the chamber is disposed on the outside of the display unit,
   wherein the display unit comprises at least one of a cutout part and a transparent part so that whether the external device is inserted in the chamber can be determined by seeing through the at least one of the cutout part and the transparent part.

18. The method of claim 17, further including:
   providing for an input part arranged on the base unit, the input part having an operation face.

19. The method of claim 17, wherein the display unit is capable of closing the display face when the personal computer is not in use.

20. A personal computer comprising:
   a display unit having a display face, the display unit movably coupled to a base unit such that an angle between the display face and the base unit is generally less than 180° ; and
   a chamber disposed within the display unit, the chamber adapted to accept at least a portion of a removable external device therewithin,
   wherein the display unit comprises at least one of a cutout part and a transparent part so that whether the external device is inserted in the chamber can be determined by seeing through the at least one of the cutout part and the transparent part.

21. A method for providing an interface to a removable external device in a computer comprising:
   forming a chamber in a display unit of the computer, the display unit having a display face, the display unit being movably coupled to a base unit such that the display face forms an angle generally less than 180° with the base unit such that an opening associated with the chamber is exposed to the outside of the display unit; and
   providing an electrical connection inside the chamber such that at least a portion of the removable external device is capable of being inserted into the chamber such that an electrical connection is established therewithin between the removable external device and the electrical connector,
   wherein the display unit comprises at least one of a cutout part and a transparent part so that whether the external device is inserted in the chamber can be determined by seeing through the at least one of the cutout part and the transparent part.

22. An apparatus for interfacing a computer with a removable external device, the apparatus comprising:
   a display unit coupled to the computer, the display unit having a display face and being movably coupled to a base unit such that the display face forms an angle generally less than 180° with the base unit; and
   a chamber having a predetermined depth, the chamber disposed in the display unit, the chamber having an electrical connection in an innermost recess thereof, the chamber configured to accept at least a portion of the removable external device such that an electrical connection can be established between the computer and the removable external device,
   wherein the display unit comprises at least one of a cutout part and a transparent part so that whether the external device is inserted in the chamber can be determined by seeing through the at least one of the cutout part and the transparent part.

23. An apparatus for interfacing a computer with a removable external device, the apparatus comprising:
- a display unit coupled to the computer, the display unit having a display face and being movably coupled to a base unit such that the display face forms an angle generally less than 180° with the base unit; and
- a chamber formed inside the display unit, the chamber having walls capable of covering the bottom side, a left and right side, and a front and back side of the removable external device, the chamber having an opening disposed on the outside of the display unit configured to adaptably receive the removable external device, wherein the display unit comprises at least one of a cutout part and a transparent part so that whether the external device is inserted in the chamber can be determined by seeing through the at least one of the cutout part and the transparent part.

* * * * *